US008341808B2

(12) United States Patent
Vermillion et al.

(10) Patent No.: US 8,341,808 B2
(45) Date of Patent: Jan. 1, 2013

(54) CLIP

(76) Inventors: Kenneth B. Vermillion, Highlands, TX (US); Bradley N. Vermillion, Highlands, TX (US)

( * ) Notice: Subject to any disclaimer, the term of this patent is extended or adjusted under 35 U.S.C. 154(b) by 693 days.

(21) Appl. No.: 12/586,560

(22) Filed: Sep. 24, 2009

(65) Prior Publication Data

US 2010/0018013 A1 Jan. 28, 2010

Related U.S. Application Data

(63) Continuation-in-part of application No. PCT/US2008/013468, filed on Dec. 8, 2008.

(60) Provisional application No. 61/007,005, filed on Dec. 10, 2007.

(51) Int. Cl.
*A44B 99/00* (2010.01)

(52) U.S. Cl. ............................... 24/336; 24/545; 24/338

(58) Field of Classification Search .................... 24/329, 24/331, 336, 338, 499, 485, 545, 557, 558, 24/565, 531

See application file for complete search history.

(56) References Cited

U.S. PATENT DOCUMENTS

| | | | | |
|---|---|---|---|---|
| 3,837,290 | A | 9/1974 | Dur | |
| 4,830,244 | A * | 5/1989 | Brannon | 224/103 |
| 4,966,344 | A * | 10/1990 | Gary | 24/532 |
| 5,600,873 | A | 2/1997 | May | |
| 5,687,458 | A | 11/1997 | Coker | |
| 5,761,843 | A | 6/1998 | Lynch et al. | |
| 5,774,957 | A | 7/1998 | Kohl et al. | |
| 6,044,582 | A | 4/2000 | Johnson | |
| 6,654,990 | B2 | 12/2003 | Liu | |
| 7,055,281 | B1 | 6/2006 | Faneuf | |
| 7,213,307 | B2 * | 5/2007 | Votel | 24/557 |
| 7,581,292 | B2 * | 9/2009 | Votel | 24/336 |
| 2006/0260105 | A1 * | 11/2006 | Votel | 24/545 |

* cited by examiner

*Primary Examiner* — Robert J Sandy
(74) *Attorney, Agent, or Firm* — John R Casperson

(57) ABSTRACT

A clip has an opposed jaw end, a bridged back end and defines a slot extending across the bridged back end. It is connected to an article, for example, another clip or a float, which has an enlarged spherical head extending longitudinally therefrom. The head of the post has a diameter which is slightly greater than the width of the slot so that the connected item has rotational freedom of movement by receipt of the spherical head through the slot.

19 Claims, 3 Drawing Sheets

CLIP

CROSS REFERENCES TO RELATED APPLICATIONS

This application is a continuation in part of and claims the benefit of copending U.S. application serial number PCT/US2008/013468 titled "Clip" which designated the United States and had an international filing date of 8 Dec. 2008. Application serial number PCT/US2008/013468 had an international publication number of WO 2009/075809, an international publication date of 18 Jun. 2009, and claims a priority date of 10 Dec. 2007 from U.S. 61/007,005, the benefit of which is claimed.

FIELD OF THE INVENTION

This invention relates to a clip end attached to another object via a swiveling connector. In one aspect, this invention relates generally to a double-ended clip for mounting articles on a user's belt or clothing. In another aspect, this invention relates to a clip-float combination which can be used to identify fish in a live well.

BACKGROUND OF THE INVENTION

The disclosure of U.S. Pat. No. 5,687,458 titled "Clip for Releasably Attaching Articles Together" issued Nov. 18, 1997 is incorporated by reference herein.

In a plant setting, particularly, it is often important for workers to have safety gear in their possession. For example, gloves, helmets, ear muffs, safety glasses, radios and flashlights provide no protection unless they are used when a hazard presents itself. Construction workers often carry the tools of their trade, such as hammers, knives, tape measures and drills mounted to their belts. A clip to facilitate such mounting would be very desirable.

Fishermen often keep their catch in "live wells," and replace the smaller fish in the live well with larger ones as they are caught. A clip which can be used, in conjunction with a log, to identify the individual fish in the live well, so that they can be selectively removed from the well would be very desirable.

OBJECTS OF THE INVENTION

It is an object of the present invention to provide. a swivel connection for a clip.

It is another object to provide a clip retained to another clip or other object via a swivel connection.

It is a further object to provide double ended clip for maintaining articles releasably clipped to a belt or clothing.

It is an additional object to provide a fisherman's clip useful for identifying fish in live wells.

A further object of this invention is to provide clips which are simple in construction and economical to manufacture.

SUMMARY OF THE INVENTION

In one embodiment of the invention there is provided a resilient clip. The clip has a front end defining openable opposed jaws, a bridged back end, and a longitudinal axis extending between the front end and the back end. The clip has an upper longitudinally elongated finger gripping portion and a lower longitudinally elongated finger gripping portion extending from the bridged back end and diverging from each other in vertically opposed relation when viewed from the side. The clip has a narrow rectangular portion extending from a forward end of each finger gripping portion in laterally opposed crossed relation. An upper L-shaped jaw portion extends from each narrow rectangular portion extending from the lower finger gripping portion. A lower L-shaped jaw portion extends from each narrow rectangular portion extending from the upper finger gripping portion. Each L-shaped jaw portion is wider than the narrow rectangular portion. Each of the finger gripping portions is sufficiently resilient so that when pressed together by the fingers of an operator, the jaw portions will open and when released will be biased toward an abutted condition. The clip further defines a slot extending across the bridged back end and partway down the finger gripping portions. The slot has a width dimension and is for receiving a post having an enlarged generally spherical head, the head of the post having a diameter which is slightly greater than the width of the slot.

In another embodiment of the invention, there is provided a clip assembly for maintaining articles releasably clipped together. The assembly comprises a first resilient clip member and a second resilient clip member. The clip members each have a front end defining openable opposed jaws, a bridged back end, and a longitudinal axis extending between the front end and the back end. The first resilient clip member further defines a slot extending across the bridged back end, said slot having width dimension, and the second resilient clip member further defines a post having an enlarged spherical head extending longitudinally from the bridged back end, the head of the post having a diameter which is slightly greater than the width of the slot. The second clip is connected to the first clip for rotational freedom of movement by receipt of the spherical head through the slot.

Another embodiment of the invention comprises a resilient clip member and a float element. The resilient clip member has a front end defining openable opposed jaws, a bridged back end, and a longitudinal axis extending between the front end and the back end. The resilient clip member further defines a slot extending across the bridged back end. The float element has an enlarged buoy-shaped first end and a second end having a post with an enlarged spherical head. The head of the post has a diameter which is slightly greater than the width of the slot. The float element is connected to the resilient clip member for rotational freedom of movement by receipt of the spherical head through the slot.

DETAILED DESCRIPTION OF THE INVENTION

Figure 1:
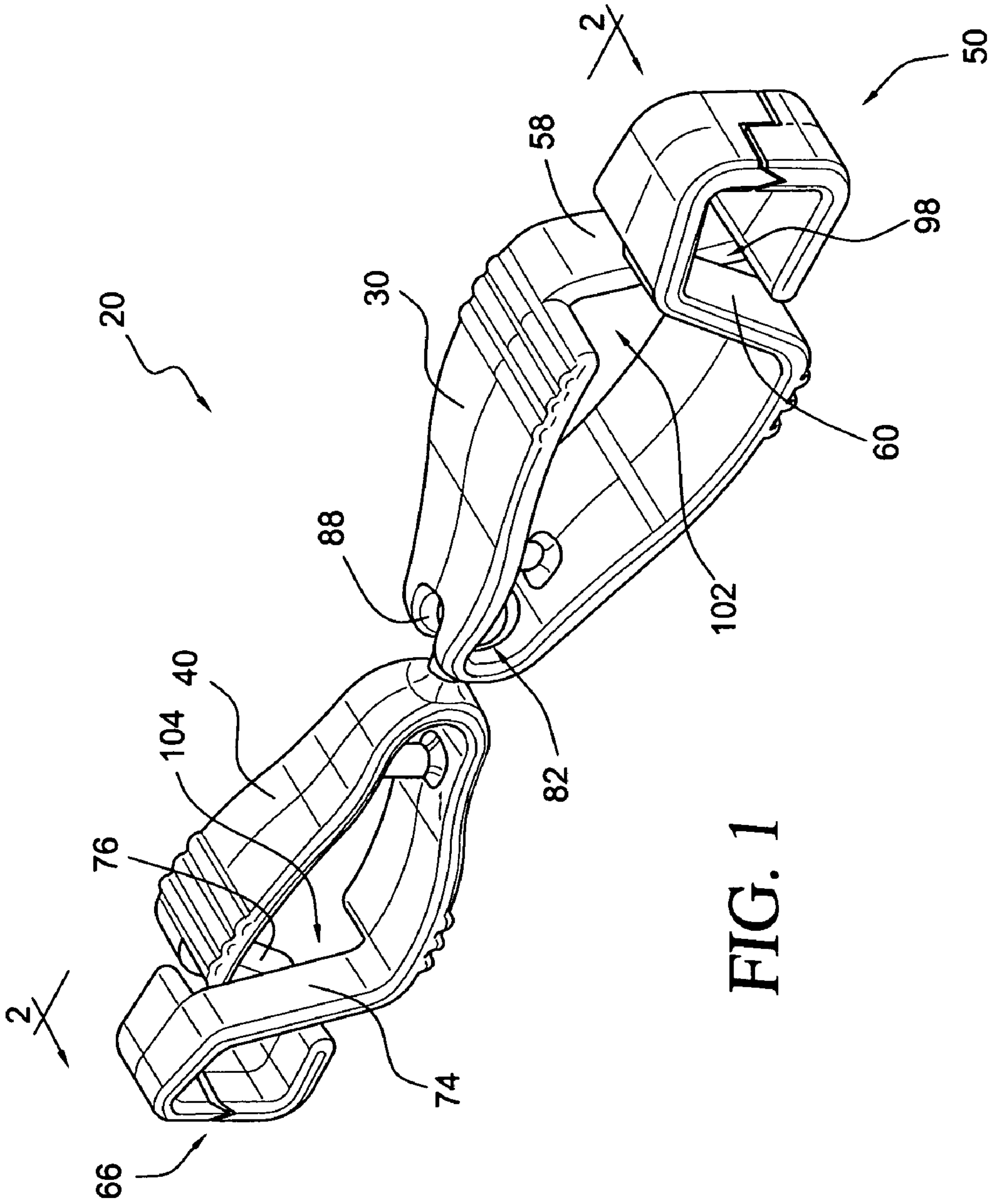
FIG. 1 is a pictorial illustration of a double ended clip according to certain embodiments of the invention.

In one embodiment of the invention, there is provided a clip assembly 20 for maintaining articles releasably clipped together. The assembly comprises a first resilient clip member 30 and a second resilient clip member 40. The clip members each have a front end 50, 66 defining openable opposed jaws, a bridged back end 52, 68, and a longitudinal axis extending between the front end and the back end. The first resilient clip member further defines a slot 82 extending across the bridged back end, said slot having width dimension, and the second resilient clip member further defines a post 84 having an enlarged spherical head 86 extending longitudinally from the bridged back end, the head of the post having a diameter which is slightly greater than the width of the slot. The second clip is connected to the first clip for rotational freedom of movement by receipt of the spherical head through the slot.

One embodiment of the invention provides a double ended clip assembly 20 for maintaining articles releasably clipped together. The clip comprises a first resilient clip member 30 and a second resilient clip member 40.

Figure 2:
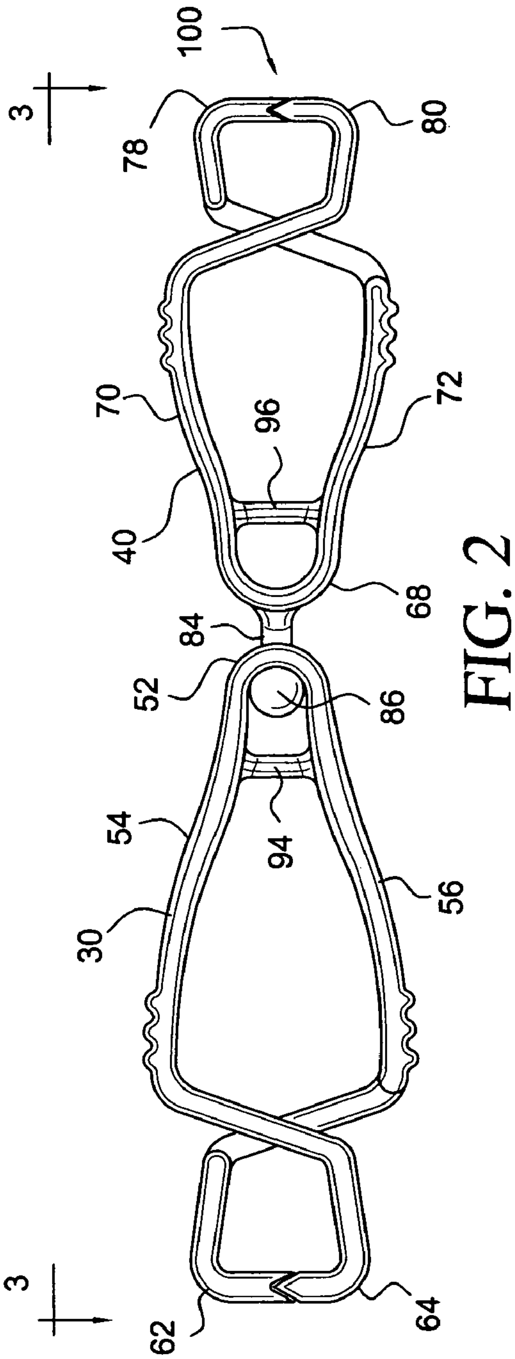
FIG. 2 is a side view of the double ended clip of FIG. 1.

The first resilient clip member has a front end 50 defining openable opposed jaws, a bridged back end 52, and a longitudinal axis extending between the front end and the back end. An upper longitudinally elongated finger gripping portion 54 and a lower longitudinally elongated finger gripping portion 56 extend from the bridged back end and diverge from each other in vertically opposed relation when viewed from the side. See FIG. 2. A narrow rectangular portion 58, 60 extends from a forward end of each finger gripping portion in laterally opposed crossed relation. An upper L-shaped jaw portion 62 extends from the narrow rectangular portion which extends from the lower finger gripping portion. A lower L-shaped jaw portion 64 extends from the narrow rectangular portion which extend from the upper finger gripping portion. Each L-shaped jaw portion is wider than the narrow rectangular portion. Each of the finger gripping portions is sufficiently resilient, or sufficiently biased to close the jaws, such that when pressed together by the fingers of an operator, the jaw portions will open and when released will be biased toward an abutted condition.

The second resilient clip member has a front end 66 defining openable opposed jaws, a bridged back end 68, and a longitudinal axis extending between the front end and the back end. The second resilient clip member has an upper longitudinally elongated finger gripping portion 70 and a lower longitudinally elongated finger gripping portion 72 extending from the bridged back end and diverging from each other in vertically opposed relation when viewed from the side. See FIG. 2. A narrow rectangular portion 74, 76 extends from a forward end of each finger gripping portion in laterally opposed crossed relation. An upper L-shaped jaw portion 78 extends from the narrow rectangular portion which extends from the lower finger gripping portion. A lower L-shaped jaw portion 80 extends from the narrow rectangular portion which extends from the upper finger gripping portion. Each L-shaped jaw portion is wider than the narrow rectangular portion. Each of the finger gripping portions is sufficiently resilient, or biased toward closing the jaws, such that when pressed together by the fingers of an operator, the jaw portions will open and when released will be biased toward an abutted condition.

The first resilient clip member further defines a slot 82 extending across the bridged back end and partway down the finger gripping portions. The slot has a width dimension.

The second resilient clip member further defines a post 84 having an enlarged spherical head 86 extending longitudinally from the bridged back end. The head of the post has a diameter which is slightly greater than the width of the slot.

Other articles can be attached to the first resilient clip member if desired by providing the article to be attached with a protruding post having an enlarged spherical head.

The second clip member is connected to the first clip member for rotational freedom of movement around the longitudinal axis of the clip by receipt of the spherical head through the slot. The first resilient clip member preferably faces oppositely from the second resilient clip member. Each of the first resilient clip member and the second resilient clip member is preferably of unitary construction, and is more preferably constructed of injection molded plastic.

The slot is preferably sized to releasably retain the head, so that the clip members become disconnected from each other upon exposure to axially opposed force of predetermined magnitude. The post is preferably loosely carried in the slot and the head is positioned against an inner surface of the bridged back end of the first resilient clip member. The inner surface of the bridged back end of the first resilient clip member is preferably cylindrically shaped to accommodate the spherical head of the second resilient clip.

The slot preferably has a length in the range of from 2 to 4 times the diameter of the sphere. The slot preferably has an inlet 88 on the outer surface of the clip which is beveled and an inlet on the inner surface of the clip which is square. This structure permits the clips to be assembled with less force than is required for disassembly. The diameter of the sphere is preferably in the range of 1.02 to 1.2 times the width of the slot.

The post preferably has a diameter which is in the range of 0.2 to 0.8 times the diameter of the sphere and a length which is in the range of 0.5 to 5 times the diameter of the sphere.

In the preferred embodiment, the bridged-back end of the first resilient clip member is formed by a pair of juxtaposed arcuate links 90, 92. Because the clip is formed from resilient material, the links separate sufficiently to permit assembly, and snap back to their original configuration to lock in the sphere.

The clip elements are preferably cross braced to provide greater closing bias. A first cross-brace 94 extends between the upper longitudinally elongated finger gripping portion and the lower longitudinally elongated finger gripping portion of the first resilient clip member. The first cross brace is positioned normal to the longitudinal axis of the first resilient clip member and spaced apart from the bridged back end of the first resilient clip member. A second cross-brace 96 extends between the upper longitudinally elongated finger gripping portion and the lower longitudinally elongated finger gripping portion of the second resilient clip member. The second cross brace is positioned normal to the longitudinal axis of the second resilient clip member and spaced apart from the bridged back end of the second resilient clip member.

For enhanced gripping strength, the jaws of each of the first resilient clip member and the second resilient clip member come together along a "Z" shaped parting line 98 with right angle turns. The jaws of each of the first resilient clip member and the second resilient clip member come together in an angular tongue in groove 100 abutting relationship.

To provide operating clearances, each of the resilient clip members preferably defines a pair of generally rectangular cutouts 102, 104 through which the narrow rectangular portions pass.

Figure 3:
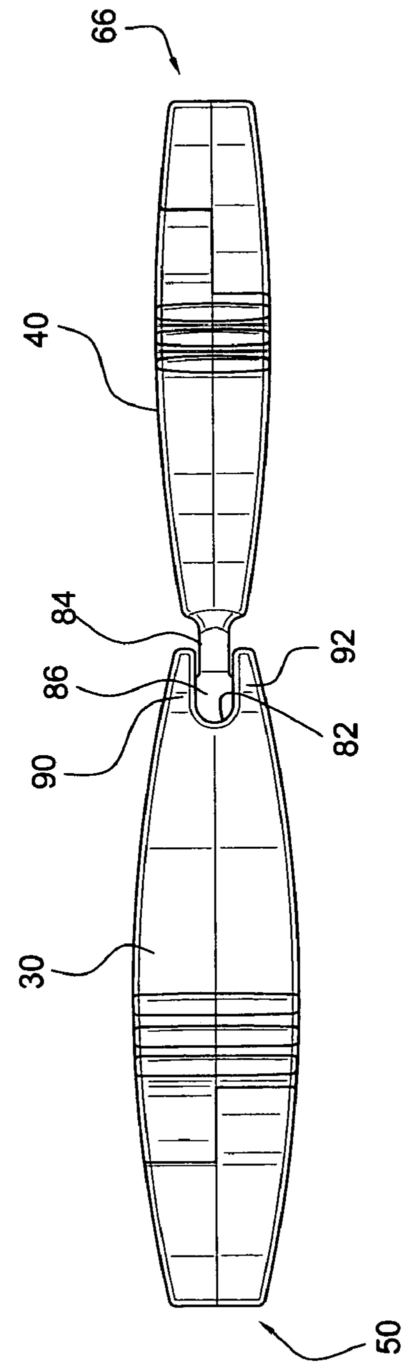
FIG. 3 is a top view of the double ended clip taken along perspective lines 3-3 of FIG. 2.

To reduce the likelihood of snagging, the clips are preferably streamlined. When viewed from above, (see FIG. 3), a mid-section of each of the first resilient clip and the second resilient clip is wider than the bridged back end and the jaws, and, when viewed from the side, (see FIG. 2) a mid-section of each of the first resilient clip and the second resilient clip is wider than the bridged back end and the jaws.

The preferred clip is formed of resilient, dielectric material. Many thermoplastic polymers are suitable. An engineering grade plastic with good structural properties is preferred. All pieces are preferably injection molded.

The clips are retained together by interference between the spherical head and the pair of juxtaposed arcuate links. However, upon an axial force of predetermined magnitude, the spherical surface of the head will wedge apart the juxtaposed arcuate links sufficiently to permit passage of the head between the links, and thus permit separation of the clips. In a preferred embodiment, this occurs at approximately 30 to 50 pounds of axial force.

Figure 4:
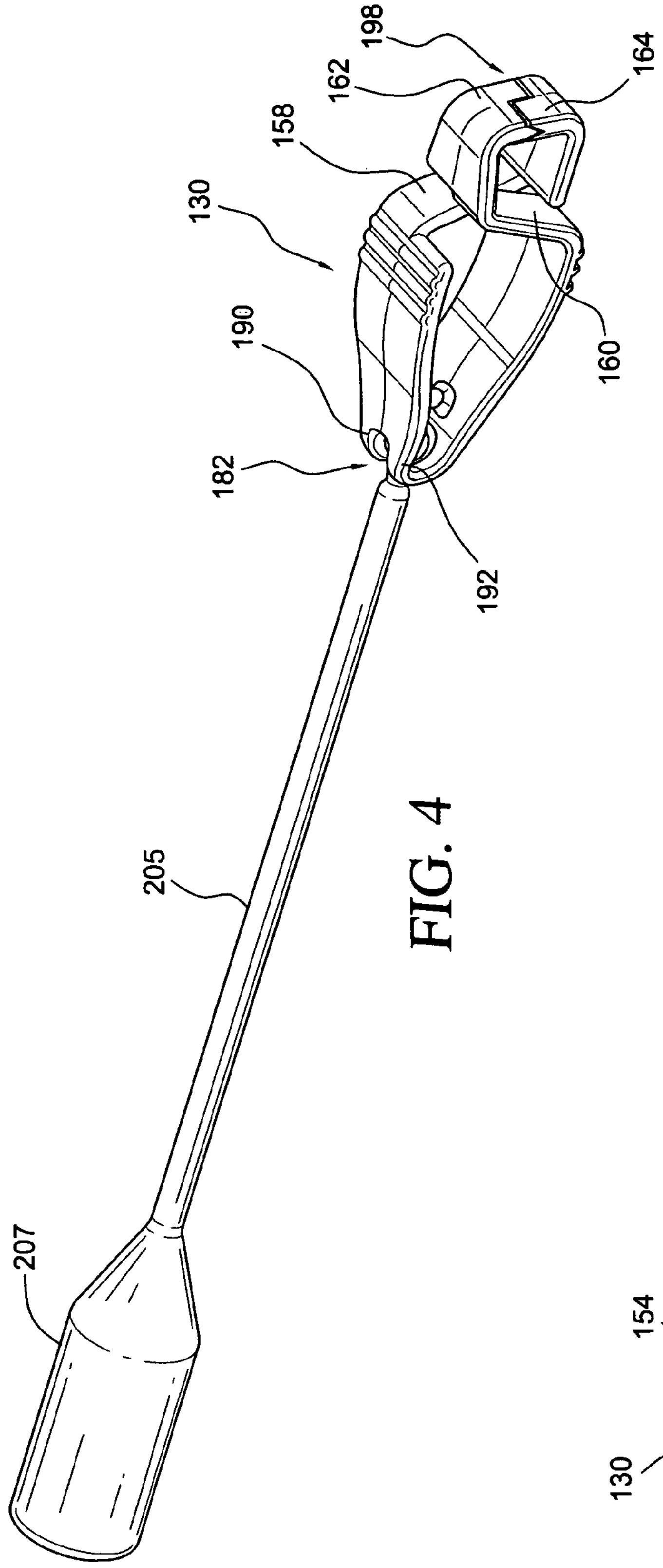
FIG. 4 is a pictorial illustration of a clip/float assembly in accordance with another embodiment of the invention.
Figure 5:
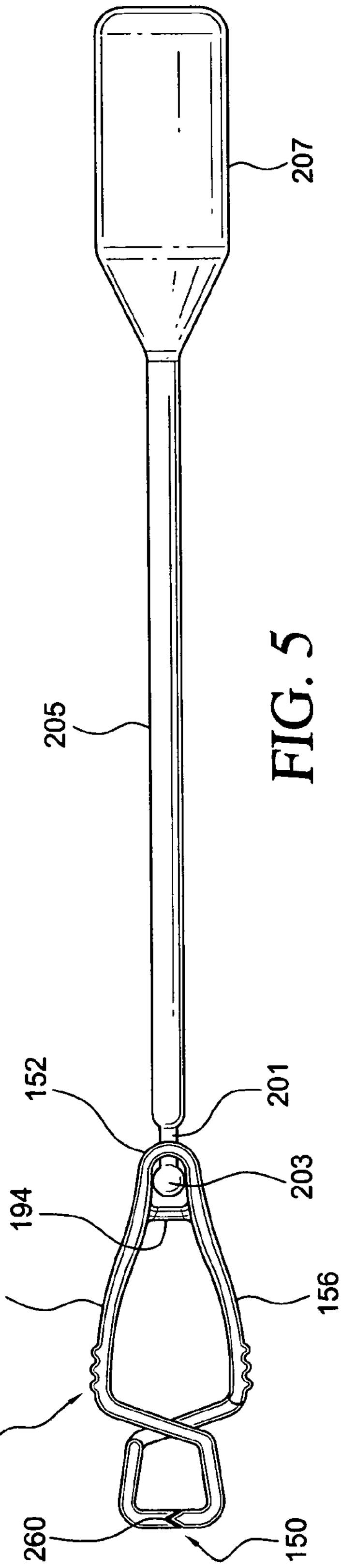
FIG. 5 is a side view of the clip float/arm assembly of FIG. 4.

FIGS. 4 and 5 illustrate a clip and float assembly in accordance with another embodiment of the invention. The invention comprises a resilient clip member 130 and a float element 207. The resilient clip member has a front end 150 defining openable opposed jaws, a bridged back end 152, and a longitudinal axis extending between the front end and the back end. The resilient clip member further defines a slot 182 extending across the bridged back end. The slot has a width dimension which is preferably uniform. The float element has an enlarged buoy-shaped first end and a second end having a post 201 with an enlarged spherical head 203, the head of the post having a diameter which is slightly greater than the width of the slot. The float element is connected to the resilient clip member for rotational freedom of movement by receipt of the spherical head through the slot. The float element is preferably free to extend from the longitudinal axis of the clip over an angle of at least +/−90 degrees in the plane of FIG. 5 and over an angle of at least +/−10 degrees normal to the plane of FIG. 5.

The clip and float assembly preferably further comprises a rod element 205 connecting the enlarged buoy-shaped first end with the post. The rod element has a diameter greater than the diameter of the post and is structurally self-supporting. Preferably, the float element is hollow, for floatation, and is coded, for example by color, numerically, or by other means, to facilitate associating a fish attached to the clip, for example by its lower lip, with data about the fish, such as length or weight. This enables a fisherman to replace smaller fish with larger ones as they are caught, consulting a log book or other record if necessary, to maximize stringer weight.

In a preferred embodiment, the clip 130 is structurally the same as the clip 30 previously described. An upper longitudinally elongated finger gripping portion 154 and a lower longitudinally elongated finger gripping portion 156 extend from the bridged back end and diverge from each other in vertically opposed relation when viewed from the side. A narrow rectangular portion 158, 160 extends from a forward end of each finger gripping portion in laterally opposed crossed relation. An upper L-shaped jaw portion 162 extends from the narrow rectangular portion which extends from the lower finger gripping portion. A lower L-shaped jaw portion 164 extends from the narrow rectangular portion which extend from the upper finger gripping portion. Each L-shaped jaw portion is wider than the narrow rectangular portion. Each of the finger gripping portions is sufficiently resilient, or sufficiently biased to close the jaws, such that when pressed together by the fingers of an operator, the jaw portions will open and when released will be biased toward an abutted condition. For enhanced gripping strength, the jaws of the resilient clip member come together along a “Z” shaped parting line 198 with right angle turns. The jaws of each of the first resilient clip member and the second resilient clip member come together in an angular tongue in groove 200 abutting relationship.

In the preferred embodiment, the bridged back end of the resilient clip member is formed by a pair of juxtaposed arcuate links 190, 192. Because the clip is formed from resilient material, the links separate sufficiently to permit assembly, and snap back to their original configuration to lock in the sphere. The clip element is preferably cross braced to provide greater closing bias. A cross-brace 194 extends between the upper longitudinally elongated finger gripping portion and the lower longitudinally elongated finger gripping portion of the first resilient clip member.

While certain preferred embodiments of the invention have been described herein, the invention is not to be construed as being so limited, except to the extent that such limitations are found in the claims.

What is claimed is:

1. A resilient clip member having a front end defining openable opposed jaws, a bridged back end, and a longitudinal axis extending between the front end and the back end, said resilient clip member having an upper longitudinally elongated finger gripping portion and a lower longitudinally elongated finger gripping portion extending from the bridged back end and diverging from each other in vertically opposed relation when viewed from the side, a narrow rectangular portion extending from a forward end of each finger gripping portion in laterally opposed crossed relation, an upper L-shaped jaw portion extending from said narrow rectangular portion extending from the lower finger gripping portion, a lower L-shaped jaw portion extending from said narrow rectangular portion extending from the upper finger gripping portion, each L-shaped jaw portion being wider than the narrow rectangular portion;

each of said finger gripping portions being sufficiently resilient such that when pressed together by the fingers of an operator, said jaw portions will open and when released will be biased toward an abutted condition, wherein the bridged back end of the resilient clip member is formed from a pair of juxtaposed arcuate links, a slot being defined between the links, said slot extending across the bridged back end and partway down the finger gripping portions, said slot having a width dimension and being for receiving a post having an enlarged generally spherical head, the head of the post having a diameter which is slightly greater than the width of the slot, the pair of juxtaposed arcuate links resiliently separating sufficiently to permit passage of the head of the post.

2. A resilient clip member as in claim 1 wherein the bridged back end of the resilient clip member is formed by a pair of juxtaposed arcuate links, and the slot has a uniform width from one end to the other end and is closed at both ends, said resilient clip further comprising in combination with an article having a protruding post and enlarged spherical head attached to the resilient clip member by receipt of the enlarged spherical head through the slot.

3. A resilient clip member as in claim 1 further comprising a cross-brace extending between the upper longitudinally elongated finger gripping portion and the lower longitudinally elongated finger gripping portion of the resilient clip member, said cross brace being positioned normal to the longitudinal axis of the resilient clip member and spaced apart from the bridged back end of the resilient clip member.

4. A resilient clip member as in claim 1 wherein an inner surface of the bridged back end of the resilient clip member is partially cylindrically shaped to accommodate the generally spherical head.

5. A resilient clip member as in claim 1 wherein the slot has an inlet on the outer surface of the resilient clip member which is beveled and an inlet on the inner surface of the resilient clip member which is squared off.

6. A resilient clip member as in claim 1 the slot has a length in the range of from 2 to 4 times its width.

7. A clip assembly for maintaining articles releasably clipped together, comprising in combination:

a first resilient clip member having a front end defining openable opposed jaws, a bridged back end, and a longitudinal axis extending between the front end and the back end, a second resilient clip member having a front end defining openable opposed jaws, a bridged back end, and a longitudinal axis extending between the front end and the back end, wherein the first resilient clip member further defines a slot extending across the bridged back end, said slot having a width dimension, and the second resilient clip member further defines a post having an enlarged spherical head extending longitudinally from the bridged back end, the head of the post having a diameter which is slightly greater than the width of the slot, said second clip being connected to the first clip for rotational freedom of movement by receipt of the spherical head through the slot, wherein the bridged back end of the first resilient clip member is formed from a pair of juxtaposed arcuate links, the slot being defined between the links, said pair of juxtaposed arcuate links resiliently separating sufficiently to permit passage of the head of the post and connection of the first resilient clip member to the second resilient clip member.

8. A clip assembly as in claim 7 wherein the first resilient clip member has an upper longitudinally elongated finger gripping portion and a lower longitudinally elongated finger gripping portion extending from the bridged back end and diverging from each other in vertically opposed relation when viewed from the side, a narrow rectangular portion extending from a forward end of each finger gripping portion in laterally opposed crossed relation, an upper L-shaped jaw portion extending from said narrow rectangular portion extending from the lower finger gripping portion, a lower L-shaped jaw portion extending from said narrow rectangular portion extending from the upper finger gripping portion, each L-shaped jaw portion being wider than the narrow rectangular portion;

each of said finger gripping portions being sufficiently resilient such that when pressed together by the fingers of an operator, said jaw portions will open and when released will be biased toward an abutted condition, the second resilient clip member has an upper longitudinally elongated finger gripping portion and a lower longitudinally elongated finger gripping portion extending from the bridged back end and diverging from each other in vertically opposed relation when viewed from the side, a narrow rectangular portion extending from a forward end of each finger gripping portion in laterally opposed crossed relation, an upper L-shaped jaw portion extending from said narrow rectangular portion extending from the lower finger gripping portion, a lower L-shaped jaw portion extending from said narrow rectangular portion extending from the upper finger gripping portion, each L-shaped jaw portion being wider than the narrow rectangular portion;

each of said finger gripping portions being sufficiently resilient such that when pressed together by the fingers of an operator, said jaw portions will open and when released will be biased toward an abutted condition;

and the slot extends across the bridged back end and partway down the finger gripping portions of the first resilient clip member between the juxtaposed arcuate links, and the slot has a uniform width from one end to the other end and is closed at both ends.

9. A clip assembly as in claim 8 wherein each of the first resilient clip member and the second resilient clip member are of unitary construction.

10. A clip assembly as in claim 8 wherein the first resilient clip member faces oppositely from the second resilient clip member.

11. A clip assembly as in claim 8 wherein the slot is sized to releasably retain the head, so that the clip members become disconnected from each other upon exposure to axially opposed force of predetermined magnitude.

12. A clip assembly as in claim 8 wherein the post is loosely carried in the slot and the head is positioned against an inner surface of the bridged back end of the first resilient clip member and the slot has a length in the range of from 2 to 4 times the diameter of the sphere.

13. A clip assembly as in claim 8 wherein the jaws of each of the first resilient clip member and the second resilient clip member come together along a "Z" shaped parting line with right angle turns.

14. A clip assembly as in claim 8 wherein the jaws of each of the first resilient clip member and the second resilient clip member come together in an angular tongue in groove abutting relationship.

15. A clip assembly as in claim 8 wherein each of the resilient clip members defines a pair of generally rectangular cutouts through which the narrow rectangular portions pass.

16. A clip assembly as in claim 8 wherein, when viewed from above, a mid-section of each of the first resilient clip and the second resilient clip is wider than the bridged back end and the jaws, and, when viewed from the side, a mid-section of each of the first resilient clip and the second resilient clip is wider than the bridged back end and the jaws, to reduce the risk of snagging the clip on an object when in use.

17. A clip and float assembly, comprising in combination:

a resilient clip member having a front end defining openable opposed jaws, a bridged back end, and a longitudinal axis extending between the front end and the back end, wherein the first resilient clip member further defines a slot extending across the bridged back end, said slot having a width dimension, and a float element having an enlarged buoy-shaped first end and a second end having a post with an enlarged spherical head, the head of the post having a diameter which is slightly greater than the width of the slot, the float element being connected to the resilient clip member for rotational freedom of movement by receipt of the spherical head through the slot.

18. A clip and float assembly as in claim 17 further comprising a rod element connecting the enlarged buoy-shaped first end with the post, said rod element having a diameter greater than the diameter of the post and being structurally self-supporting.

19. A clip and float assembly as in claim 18 wherein the float element is hollow and coded.

* * * * *